United States Patent
Podgorny et al.

(10) Patent No.: US 8,670,968 B1
(45) Date of Patent: Mar. 11, 2014

(54) SYSTEM AND METHOD FOR RANKING A POSTING

(75) Inventors: Igor A. Podgorny, San Diego, CA (US); Floyd J. Morgan, Carlsbad, CA (US); Derek Szydlowski, La Mesa, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/601,732

(22) Filed: Aug. 31, 2012

Related U.S. Application Data

(63) Continuation of application No. 12/646,859, filed on Dec. 23, 2009, now Pat. No. 8,311,792.

(51) Int. Cl.
| | | |
|---|---|---|
| *G06F 7/60* | (2006.01) | |
| *G06F 9/44* | (2006.01) | |
| *G06F 13/10* | (2006.01) | |
| *G06F 9/45* | (2006.01) | |

(52) U.S. Cl.
USPC ............. 703/13; 704/203; 704/217; 704/219; 704/246; 707/776; 707/731; 707/749; 707/734; 707/713; 706/46; 706/21; 706/15; 706/14; 706/12; 434/236; 434/107; 703/2; 703/22

(58) Field of Classification Search
USPC ........... 703/13; 434/107, 236; 705/7.29, 7.32, 705/14.41, 14.43; 706/12, 14, 15, 21, 46; 707/713, 734, 749, 791, 776; 709/203, 709/217, 219, 246
See application file for complete search history.

(56) References Cited

U.S. PATENT DOCUMENTS

| | | | | |
|---|---|---|---|---|
| 4,996,642 A * | 2/1991 | Hey | ............................. | 705/7.29 |
| 5,724,567 A * | 3/1998 | Rose et al. | ............. | 707/999.002 |
| 6,018,738 A * | 1/2000 | Breese et al. | ................. | 707/749 |
| 6,321,221 B1 * | 11/2001 | Bieganski | ..................... | 705/26.7 |
| 6,345,264 B1 * | 2/2002 | Breese et al. | ................... | 706/21 |
| 6,353,813 B1 * | 3/2002 | Breese et al. | ..................... | 706/12 |
| 6,655,963 B1 * | 12/2003 | Horvitz et al. | ................ | 434/236 |
| 6,738,764 B2 * | 5/2004 | Mao et al. | ............................. | 1/1 |
| 6,829,599 B2 * | 12/2004 | Chidlovskii | .......................... | 1/1 |
| 7,031,952 B1 * | 4/2006 | Heumann et al. | ..................... | 1/1 |
| 7,188,106 B2 * | 3/2007 | Dwork et al. | .......................... | 1/1 |
| 7,379,947 B2 * | 5/2008 | McSherry | ............................. | 1/1 |

(Continued)

OTHER PUBLICATIONS

Guo, F., Liu, C., and Wang, Y.M., Efficient Multiple-Click Models in Web Search, Proceedings of the Second ACM International Conference on Web Search and Data Mining, Feb. 2009, 8 pages.

(Continued)

*Primary Examiner* — Shambhavi Patel
(74) *Attorney, Agent, or Firm* — Osha Liang LLP

(57) ABSTRACT

A method for training a ranking application. The method includes ranking the help postings to create an initial ranking using initial parameter values, and storing user interactions with the help postings to obtain stored interactions. Simulations are performed using the stored interactions to generate revised parameter values for the ranking application. Performing the simulations includes calculating relevance values from the stored interactions, creating a test posting, assigning, to the test posting, an initial score and a relevance value randomly selected from the relevance values to generate a test ranking, and simulating user interactions with the test ranking to generate simulated rankings. The simulated rankings are analyzed to obtain revised parameter values. The method further includes ranking, using the revised parameter values, the help postings to generate a revised ranking, and displaying the help postings in the forum according to the revised ranking.

17 Claims, 7 Drawing Sheets

(56) References Cited

U.S. PATENT DOCUMENTS

| | | | |
|---|---|---|---|
| 7,461,058 B1* | 12/2008 | Rauser et al. | 1/1 |
| 7,467,232 B2* | 12/2008 | Fish et al. | 709/246 |
| 7,529,736 B2* | 5/2009 | Katariya et al. | 1/1 |
| 7,620,634 B2* | 11/2009 | Ramsey | 1/1 |
| 7,630,916 B2* | 12/2009 | Lind et al. | 705/7.29 |
| 7,640,232 B2* | 12/2009 | Fish et al. | 1/1 |
| 7,672,909 B2* | 3/2010 | Meijer et al. | 706/12 |
| 7,689,520 B2* | 3/2010 | Burges et al. | 706/12 |
| 7,707,226 B1* | 4/2010 | Tonse | 707/796 |
| 7,739,408 B2* | 6/2010 | Fish et al. | 709/246 |
| 7,743,050 B1* | 6/2010 | Bem et al. | 707/713 |
| RE41,899 E* | 10/2010 | Rose et al. | 706/46 |
| 7,827,125 B1* | 11/2010 | Rennison | 706/14 |
| 7,856,446 B2* | 12/2010 | Brave et al. | 707/776 |
| 8,126,839 B2* | 2/2012 | Chen et al. | 707/603 |
| 2002/0073167 A1* | 6/2002 | Powell et al. | 709/217 |
| 2002/0076674 A1* | 6/2002 | Kaplan | 434/107 |
| 2002/0169595 A1* | 11/2002 | Agichtein et al. | 704/9 |
| 2005/0060222 A1* | 3/2005 | White | 705/10 |
| 2006/0224577 A1* | 10/2006 | Hullender et al. | 707/5 |
| 2006/0242139 A1* | 10/2006 | Butterfield et al. | 707/5 |
| 2006/0242178 A1* | 10/2006 | Butterfield et al. | 707/100 |
| 2007/0016473 A1* | 1/2007 | Anderson et al. | 705/14 |
| 2007/0088693 A1* | 4/2007 | Lawrence | 707/5 |
| 2007/0106659 A1* | 5/2007 | Lu et al. | 707/5 |
| 2007/0255702 A1* | 11/2007 | Orme | 707/5 |
| 2008/0027925 A1* | 1/2008 | Li et al. | 707/5 |
| 2008/0208836 A1* | 8/2008 | Zheng et al. | 707/5 |
| 2008/0222062 A1* | 9/2008 | Liu et al. | 706/15 |
| 2008/0235187 A1* | 9/2008 | Gade et al. | 707/3 |
| 2009/0099996 A1* | 4/2009 | Stefik | 706/54 |
| 2009/0106221 A1* | 4/2009 | Meyerzon et al. | 707/5 |
| 2009/0265290 A1* | 10/2009 | Ciaramita et al. | 706/12 |
| 2010/0036828 A1* | 2/2010 | Carmel et al. | 707/5 |
| 2010/0057555 A1* | 3/2010 | Butterfield et al. | 705/14.41 |
| 2010/0094904 A1* | 4/2010 | Jandhyala | 707/791 |
| 2010/0318484 A1* | 12/2010 | Huberman et al. | 706/46 |
| 2011/0029517 A1* | 2/2011 | Ji et al. | 707/734 |
| 2011/0125572 A1* | 5/2011 | Cantu-Paz et al. | 705/14.43 |

OTHER PUBLICATIONS

Guo, F., Liu, C., and Wang, Y.M., Efficient Multiple-Click Models in Web Search, Presentation, Feb. 11, 2009, 39 pages.

Ciaramita, et al. "Online Learning from Click Data for Sponsored Search", Apr. 21-25, 2008, 10 pages.

Brille, et al. "Using Web-Graph Distance for Relevance Feedback in Web Search", SIGIR '06, Aug. 6-11, 2006, 7 pages.

Xu, et al. "A Method of Capturing the Public Mood Levels in Emergency Based on Internet Comments", IEEE, Jun. 25-27, 2008, 4 pages.

Hosanager, et al. "A Utility Theoretic Approach to Determining Optimal Wait Times in Distributed Information Retrieval", AMC, Aug. 15-19, 2005, 7 pages.

Vazirigiannis, et al., "Web Page Rank predicition with Markov Models", WWW 2008, Apr. 21-25, 2008, 2 pages.

Clarke, et al., "Relevance Ranking for One to Three Term Queries", Information Processing and Management 36, Jul. 10, 1998, 21 pages.

Agichtein, et al., "Improving Web Search ranking by Incorporating User Behavior Information", ACM, Aug. 6-11, 2006, 8 pages.

Agichtein, et al., "Learning User Interaction Models for Predicting Web Search Result Preferences", Aug. 6-11, 2006, 8 pages.

Phelan, et al., "Simulation Based Approach to Evaluate a Distributed Search Engine", International Conference WWW, Nov. 5-8, 2003, 8 pages.

* cited by examiner

SYSTEM AND METHOD FOR RANKING A POSTING

CROSS-REFERENCE TO RELATED APPLICATION

This patent application is a continuation of U.S. patent application Ser. No. 12/646,859, filed on Dec. 23, 2009 now U.S. Pat. No. 8,311,792, and assigned to assignee of the present application. Accordingly, this patent application claims benefit of U.S. patent application Ser. No. 12/646,859 under 35 U.S.C. §120. U.S. patent application Ser. No. 12/646,859 is hereby incorporated in its entirety.

BACKGROUND

Finances can be complicated. Specifically, finances include managing various financial accounts (e.g., credit card accounts, checking accounts, savings accounts), managing different sources of income, having various financial obligations (e.g., obligations derived from healthcare and repayment of loans), planning for future events, preparing reports (e.g., tax return and other filings), etc. In efforts to simplify finances, users may use a financial application. The financial application organizes and simplifies the financial landscape of an individual or an organization.

On occasion, a user of a financial application requires assistance to use the financial application. For example, the user may require technical assistance regarding how to use the financial application or financial assistance regarding how to classify or input financial data. When a user requires assistance, the user may contact support personnel (e.g., by telephone, email, or chat) and/or may use documents, such as help files and tutorials, generated by the vendor of the financial application or professional tutors of the financial application.

In addition to documents, the user may access a community help forum for the financial application. A community help forum is a virtual location that allows different users to communicate about a topic. Users may review existing postings in the community help forum and transmit new postings containing questions, comments, or answers to the community help forum. Thus, the community help forum provides a communication link between users. Using the community help forum, users may share experiences with the financial application and assist each other.

When postings are displayed in the community help forum, the postings are ranked. An optimal ranking of postings lists postings in order of relevance. Specifically, the optimal ranking of the postings allows users to view the most relevant postings first without having to view postings that are not relevant. Many algorithms exist that provide a heuristic to the optimal ranking. Specifically, each algorithm attempts to achieve the optimal ranking so that users may quickly find the posting that answers the users' questions.

SUMMARY

In general, in one aspect, the invention relates to a method for training a ranking application to rank a plurality of help postings for display in a forum. The method includes ranking the plurality of help postings to create an initial ranking using initial parameter values, and storing user interactions with the plurality of help postings presented according to the initial ranking to obtain stored interactions. The method further includes performing simulations using the stored interactions to generate revised parameter values for the ranking application. Performing the simulations includes calculating a plurality of relevance values from the stored interactions, creating a test posting, assigning, to the test posting, an initial score and a relevance value randomly selected from the plurality of relevance values to generate a test ranking, and simulating user interactions with the plurality of help postings and the test posting in the test ranking to generate simulated rankings of the plurality of help postings and the test posting. The simulated rankings are analyzed based on the relevance value to obtain revised parameter values. The method further includes ranking, by the ranking application using the revised parameter values, the plurality of help postings to generate a revised ranking, and displaying the plurality of help postings in the forum according to the revised ranking.

In general, in one aspect, the invention relates to a system for training a ranking application to rank a plurality of help postings for display in a forum. The system includes a hardware processor, a ranking application executing on the hardware processor, and a simulation application executing on the hardware processor. The ranking application is configured to rank the plurality of help postings to create an initial ranking using initial parameter values, store user interactions with the plurality of help postings presented according to the initial ranking to obtain stored interactions, and rank, using revised parameter values, the plurality of help postings to generate a revised ranking. The simulation application is configured to perform simulations using the stored interactions to generate revised parameter values for the ranking application. Performing the simulations includes calculating a plurality of relevance values from the stored interactions, creating a test posting, assigning, to the test posting, an initial score and a relevance value randomly selected from the plurality of relevance values to generate a test ranking, and simulating user interactions with the plurality of help postings and the test posting in the test ranking to generate simulated rankings of the plurality of help postings and the test posting. The simulated rankings are analyzed based on the relevance value to obtain revised parameter values. The simulation application is further configured to provide the revised parameter values to the ranking application.

In general, in one aspect, the invention relates to a computer readable medium comprising computer readable program code embodied therein. The computer readable program code causes a computer system to rank a plurality of help postings to create an initial ranking using initial parameter values, and store user interactions with the plurality of help postings presented according to the initial ranking to obtain stored interactions. The computer readable program code further causes the computer system to perform simulations using the stored interactions to generate revised parameter values for the ranking application. Performing the simulations includes calculating a plurality of relevance values from the stored interactions, creating a test posting, assigning, to the test posting, an initial score and a relevance value randomly selected from the plurality of relevance values to generate a test ranking, and simulating user interactions with the plurality of help postings and the test posting in the test ranking to generate simulated rankings of the plurality of help postings and the test posting. The simulated rankings are analyzed based on the relevance value to obtain revised parameter values. The computer readable program code further causes the computer system to rank, using the revised parameter values, the plurality of help postings to generate a revised ranking.

Other aspects of the invention will be apparent from the following description and the appended claims.

DETAILED DESCRIPTION

Figure 1:
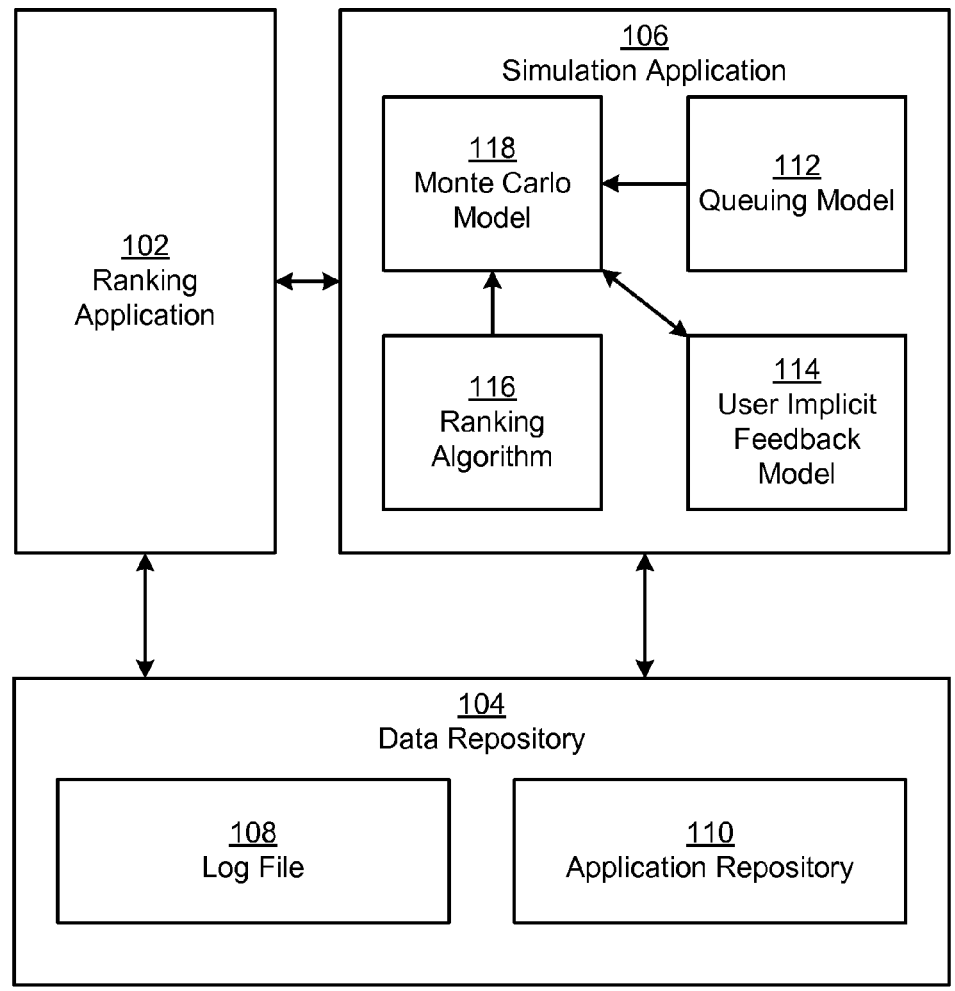
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for training a ranking application to rank postings in a forum. In one or more embodiments of the invention, a posting is a document that includes information to assist users. For example, a posting may correspond to a textual or multimedia based document that is capable of being displayed within a webpage, a tutorial, a frequently asked questions (FAQ) page, or other such document. The posting may be provided, for example, by a user in a predefined class of users, by a general user, by the vendor or a tutor of the financial application, or another provider. In one or more embodiments of the invention, the class of users providing the documents may be expert users (e.g., users deemed to have financial expertise, such as professional accountants).

In one or more embodiments of the invention, postings are grouped in the forum. Specifically, postings may be grouped based on the topic of the posting, the origin of the posting (e.g., who provided the posting), whether the posting is a question or an answer to a question, whether the posting achieved a threshold popularity level, age of the posting, type of posting, and/or other such grouping. For example, FAQs and tutorials may be grouped separately in the community help forum from postings provided by general users.

In one or more embodiments of the invention, a ranking application (discussed below) ranks postings in a group for display to the user. Specifically, postings are displayed in the order defined by the ranking. In one or more embodiments of the invention, the ranking is based on a function that uses attributes of the posting and one or more parameter values. The parameter values are constant values when applied to each of the postings' attributes during a specific ranking. Adjusting the parameter values changes the manner in which the postings are ranked. Specifically, adjusting the parameter values affects how much weight is given to each of the attributes of each of the postings. Therefore, adjusting the parameter values may result in a ranking that is closer to an optimal ranking in which postings are ordered based on relevance or closer to a random ranking.

Embodiments of the invention train the ranking application by simulating users' interactions with the ranking application. Specifically, initial parameter values are used to rank the postings in initial rankings. As users interact with the initial rankings in the community help forum, embodiments of the invention store users' interactions with the initial ranking.

In one or more embodiments of the invention, the stored interactions are used to train the ranking application using a series of simulations. In a simulation, a test document is assigned a randomly selected relevance value that is generated from the stored interactions. The simulations simulate user interactions with the test document to determine how the test document is ranked with different parameter values. By analyzing how the different parameter values rank the test document and comparing the rank with the relevance value, revised parameter values may be generated. In one or more embodiments of the invention, the revised parameter values are used by ranking application to rank the help postings.

FIG. 1 shows a schematic diagram of a system in accordance with one or more embodiments of the invention. In one or more embodiments of the invention, the system shown in FIG. 1 is executed by a computer system (discussed below and in FIG. 6). In one or more embodiments of the invention, the computer system is configured to receive and process requests received from users via a network.

As shown in FIG. 1, the system includes a ranking application (102), a data repository (104), and a simulation application (106) in accordance with one or more embodiments of the invention. Each of these components is described below.

In one or more embodiments of the invention, the ranking application (102) is an executable application that interacts with users. The ranking application (102) includes an implementation of a ranking algorithm (116). Specifically, the ranking application (102) is configured to rank postings based on the ranking algorithm (116) to generate a ranking. The ranking algorithm (116) is discussed in more detail below.

The ranking application (102) may be connected to a user interface (not shown). The user interface is the interface by which users interact with the community help forum. Specifically, the user interface may be configured to display a ranking to users. The displayed ranking may correspond to an ordered listing of postings. Each posting may be presented in the ordered listing with a title and sample contents or summary in accordance with or more embodiments of the invention. As used herein, a user examines a posting when the user reviews the title, subject, snippet, sample contents, and/or the summary or combination thereof within the ranking. For example, a user may examine the posting by reviewing the title and determining whether the posting is sufficiently relevant to view the entire posting. Further, as used herein, a user views a posting when a user selects a posting from the ranking, and additional contents of the posting are presented to the user. In one or more embodiments of the invention, the user interface is configured to obtain and store new postings, retrieve and display a ranking, and retrieve and present individual help postings to users.

Continuing with FIG. 1, the ranking application (102) is connected to a data repository (104). In one or more embodiments of the invention, the data repository (104) is any type of storage unit and/or device (e.g., a file system, database, collection of tables, or any other storage mechanism) for storing data. For example, the data repository (104) may correspond to physical memory and/or a physical storage device or may be stored in physical memory and/or a physical storage device. Further, the data repository (104) may include multiple different storage units and/or devices. The multiple different storage units and/or devices may or may not be of the same type or located at the same physical site.

In one or more embodiments of the invention, the data repository (104) stores an application repository (110) and a log file (108). In one or more embodiments of the invention, the application repository (110) includes production database and data from other data collection systems, such as web beacons and JavaScript tags. In one or more embodiments of the invention, the application repository (110) is a storage unit for help postings and user feedback. Specifically, each help posting is associated with user feedback regarding the help posting in the repository if such user feedback exists. The user feedback may include structured and unstructured feedback.

The structured feedback includes feedback from users that has a definitive value. For example, the structured feedback may include a selection of a feedback button, whether the user tracking the help posting to view response help postings, the amount of time that the user viewed the help posting, whether the user included the words, "thank you" in the comments, etc. As an example of the selection of a feedback button, when a help posting is displayed to the user to view, the help posting may be displayed with a rating button that allows a user to rate the posting from a predefined range (e.g., select 1 star if the posting is not relevant, or 5 stars if the posting is relevant). As another example of the feedback button, the help posting may be displayed with one or more of the following questions from which the user may select a yes or a no button: "Is this posting relevant?", "Is your question solved?", "Is the answer provided by the posting helpful?"

In addition to structured feedback, the user feedback may include unstructured feedback. In one or more embodiments of the invention, unstructured feedback can only be converted to a value by analysis. For example, unstructured feedback may include comments from users. By analyzing the words of the comments, such as whether the user uses generally positive words or generally negative words, embodiments of the invention may associate a numerical value with the feedback. In one or more embodiments of the invention, the user feedback is aggregated in the application repository (110). For example, rather than storing the rating that each user provides, the application repository (110) may include an average of the ratings.

In addition to user feedback, each help posting may also be associated with a score in accordance with one or more embodiments of the invention. In one or more embodiments of the invention, the score is provided by the ranking application (102) to rank the posting. Specifically, the score defines the placement of the particular posting within a ranking. The score is discussed in more detail below with reference to the ranking algorithm (116). In one or more embodiments of the invention, the score is continually updated in the application repository (110).

Continuing with the data repository (104), the log file (108) in the data repository (104) includes one or more logs of users' interactions with the ranking application (102). Specifically, each log may include how the user interacts with the rankings and multiple postings. For example, the log file (108) may include information about whether, how, and when a user finds a help posting (e.g. the number of help postings that the user viewed and/or examined before abandoning the search, the amount of time the user spent reading the posting, whether the user found the final posting that the user viewed relevant, whether the user abandoned the search without finding a relevant help posting, and other such information about the user accessing the community help forum). The information may be based on the user feedback that the user provides.

For example, consider the scenario in which a user views five postings in an initial ranking. The user views the first four postings for fifteen seconds each and then views the fifth posting for three minutes. At the end of three minutes, the user submits, "thank you" in a comments input box displayed at the end of the fifth posting. In the example, an indication that the user submitted a "thank you" is stored with the fifth posting in the application repository (110) in accordance with one or more embodiments of the invention. Further, in the example, the log file may include a list that indicates that the user viewed the first four postings for fifteen seconds each and the fifth posting, which the user found relevant, for three minutes.

Continuing with FIG. 1, a simulation application (106) is connected to the ranking application (102) and the data repository (104) in accordance with one or more embodiments of the invention. The simulation application (106) is configured to simulate users' interactions with the ranking application (102) to identify optimal parameters to use by the ranking application (102). In one or more embodiments of the invention, the simulation application (106) includes a queuing model (112), a user implicit feedback model (114), a ranking algorithm (116), and a Monte Carlo model (118). Each of these components is discussed below.

In one or more embodiments of the invention, the queuing model (112) is a stochastic model configured to approximate a real queuing situation, such as the occurrence of discrete events. For example, the discrete events may correspond to the viewing of a posting, the posting of a new help posting, the removal of a help posting, and other events affecting the community help forum. The queuing model (112) may approximate the posting interval, the viewing interval, how users interact with the ranking and the help postings, and other such queuing situations. In one or more embodiments of the invention, the posting interval is the frequency at which new postings are posted. In one or more embodiments of the invention, the viewing interval is the frequency at which postings are viewed. The queuing model (112) may be built by processing records in the application repository (110) and/or processing log files (108). For example, the queuing model (112) may be built by creating histograms that shows the number of postings versus time.

In one or more embodiments of the invention, the queuing model (112) is approximated using a Poisson Process. Using the Poisson Process, the queuing model (112) may be represented as $P_{next}(t)$, $e^{(-\lambda t)}$, where $P_{next}(t)$ is the waiting time to the next event (e.g., the next viewing of a posting, the next posting of a new posting, etc.), and where $\lambda$ is the expected frequency at which the event occurs. Specifically, $\lambda$ describes the expected number of events per unit of time. The expected values of $1/\lambda$ corresponds the average interval of time between events. For example, if $\lambda$ corresponds to the expected number of new postings per unit of time, $1/\lambda$, or $t_{new}$, is the posting interval. Similarly, if $\lambda$ corresponds to the expected number of views of a posting per unit of time, $1/\lambda$, or $t_{view}$, is the viewing interval. In one or more embodiments of the invention, the aforementioned intervals may vary with time, and may exhibit, for example, diurnal or seasonal cycles.

In one or more embodiments of the invention, the user implicit feedback model (114) is a stochastic model used to approximate user interaction with a ranking and a help posting. Specifically, a user may be biased when determining whether to examines and view a help posting. The bias may be based on the placement of the help posting within the ranking. For example, a user may be more likely to examine and subsequently view help postings at the beginning of the ranking rather than at the end of the ranking regardless of the relevance of the help posting.

In one or more embodiments of the invention, the user implicit feedback model (114) models the probability that a user examines and views a help posting. Different user implicit feedback models (114) exists that may be used. For example, the user implicit feedback model (114) may be a click model, a cascade click model, a browsing model, or any other model of user implicit feedbacks. In one or more embodiments of the invention, each of the user implicit feedback models define the relevance as the conditional probability that a user will view a help posting given that the user examined the help posting. Below is a description of each of the aforementioned models.

A click model is based on an assumption that the probability that a user examines and/or views a help posting is independent of whether the user examined and/or viewed any other help posting in the ranking. Thus, the probabilities between help postings are independent and may be defined as P(help posting is viewed)=relevance of the help posting.

A cascade click model is based on assumptions that a user examines help postings in a strict linear order, a user views only one help posting, and that the probability that a user will examine a help posting is directly dependent on whether the user examined the immediately preceding help posting. For example, if the probability that the user examines an immediately preceding help posting is zero, the probability that the user will examine a subsequent help posting is also zero in the cascade click model. The probability that a help posting is examined is conditioned on the probability that the previous help posting is determined as not relevant. The probability that a help posting is examined may be defined as $P_{down}$.

The cascade click model may be used to find performance and depth. Performance is a probability that the user finds any help posting in the ranking relevant. Depth is the average maximum rank of the help postings that the users viewed during content examination process. For each of the following, the variable 'j' refers to the $j^{th}$ help posting in the initial ranking. Further, the probability that event X occurs is denoted by P(X). The following equations may be used to determine performance and depth.

$$P_{Exam}(j+1|j) = (1 - \text{Relevance}(j))P_{down} \quad \text{eq. 1}$$

As shown in eq. 1, the probability that a help posting is examined given that the immediately preceding help posting was examined is the probability that the immediately preceding help posting is determined to not be relevant multiplied by the probability that the user will continue the search to the next help posting. Therefore, the probability that a help posting may be examined is shown in eq. 2.

$$P_{Exam}(n+1) = \prod_{j=0}^{n} P_{Exam}(j+1|j) \quad \text{eq. 2}$$

As shown in eq. 2, by multiplying the conditional probabilities that each of the preceding help postings are being examined, the probability that the $n^{th}$ help posting is examined can be calculated. Accordingly, because the performance is defined as the probability that a user determines that any help posting is relevant, performance may be calculated using eq. 3.

$$\text{Performance} = \sum_{j=0}^{\infty} \text{Relevance}(j) P_{Exam}(j) \quad \text{eq. 3}$$

As shown in eq. 3, performance is the sum over all help postings of probability that a user examines a help posting multiplied by the probability that the help posting is relevant. The probability that the help posting is examined is described in eq. 2. If $P_{down}$ is assumed to be independent of the rank, removing the indices, and substituting eq. 2 into eq. 3 produces eq. 4 (below).

$$\text{Performance} = \text{Relevance} \sum_{j=0}^{\infty} ((1 - \text{Relevance}) P_{down})^j = \frac{\text{Relevance}}{1 - (1 - \text{Relevance}) P_{down}} \quad \text{eq. 4}$$

Further, depth may be calculated as the number of help postings that a user examines before viewing a help posting. The depth may be calculated using eq. 5.

$$\text{Depth} = \sum_{j=0}^{\infty} (j+1) P_{Exam}(j) \quad \text{eq. 5}$$

As shown in eq. 5, depth is the summation over all help postings of the rank of the help posting multiplied by the probability that the help posting is examined. The probability that the help posting is examined is described in eq. 2. If $P_{down}$ is assumed to be independent of the rank, removing the indices, and substituting eq. 2 into eq. 5 produces eq. 6 (below).

$$\text{Depth} = \sum_{j=0}^{\infty} (j+1)((1 - \text{Relevance}) P_{down})^j = \frac{1}{1 - (1 - \text{Relevance}) P_{down}} \quad \text{eq. 6}$$

Solving eq. 4 and eq. 6 for $P_{down}$ and Relevance creates the eq. 7 and eq. 8, respectively.

$$P_{down} = \frac{\text{Depth} - 1}{\text{Depth} - \text{Performance}} \quad \text{eq. 7}$$

$$\text{Relevance} = \frac{\text{Performance}}{\text{Depth}} \quad \text{eq. 8}$$

As shown above, both equations use only the variables for performance and depth. In one or more embodiments of the invention, both performance and depth may be estimated by analyzing the log file (108). Further, both eq. 7 and eq. 8 account for a user bias towards help postings at the top of the ranking.

The cascade click model is only an example of a type of user implicit feedback model (114) that may be used. Alternatively, the user implicit feedback model may be a browsing model. The browsing model assumes that users may view multiple help postings and may not examine help postings linearly. In the browsing model, the probability that a particular help posting is examined is dependent on the rank of the previously viewed help posting and the number of help postings between the particular help posting and the previously viewed help posting. Similar to the cascade click model, the browsing model may be solved to model a user's interactions with a ranking.

Continuing with FIG. 1, the simulation application (106) includes a ranking algorithm (116) in accordance with one or more embodiments of the invention. In one or more embodiments of the invention, the ranking algorithm (116) is configured to assign a score (discussed above) to each help posting. The score of the help posting determines the rank of the help posting in the rankings. The score may be a function of the quality of the help posting, the popularity of the help posting, and a seed. For example, as shown below in eq. 9, the score may be calculated as a summation of the quality, the popularity, and the seed of the help posting at time t in accordance with one or more embodiments of the invention.

$$score_{posting}(t) = quality_{posting}(t) + popularity_{posting}(t) + seed_{posting}(t) \qquad \text{eq. 9}$$

In one or more embodiments of the invention, the quality of the help posting relates to the intrinsic properties of the help posting, such as whether proper English is used, the skill or experience of the user, and other intrinsic characteristics about the help posting. In alternative embodiments of the invention, the quality of each help posting is not considered or set at a value of zero.

In one or more embodiments of the invention, the popularity of the help posting relates to how users interact with the help posting. For example, popularity may be based on how many users viewed the ranking, also viewed the help posting. Popularity may also be increased when positive feedback about the help posting is received and decreased when negative feedback about the help posting is received.

The popularity may also be deflated or reduced over time. For example, the popularity may be deflated to account for inter-annual and intra-seasonal content changes to the topic of the help posting. By deflating the popularity of the help posting over time, help postings are not artificially assigned a high score merely because of the user bias toward viewing help postings at the top of the rankings. In one or more embodiments of the invention, the popularity of the help posting may be deflated over time using eq. 10.

$$d(popularity_{posting}(t)) = -\frac{popularity_n(t)}{t_{deflation}} dt + d\left(\frac{views_n}{P_{down}^n}\right), \qquad \text{eq. 10}$$

$$n = 0, \ldots, N-1$$

In eq. 10, N is the total number of help postings. $P_{down}$ is the probability that the user views the next help posting. In one or more embodiments of the invention, $(P_{down})^n$ is included to remove the bias due to the rank of the posting. As discussed above, $P_{down}$ may be calculated using a user implicit feedback model (114).

In one or more embodiments of the invention, $t_{deflation}$ is a deflation parameter to remove older help postings from the top in order to allow for more recent help postings to be given a higher score. Specifically, in one or more embodiments of the invention, the "-(popularity$_n$(t)/t$_{deflation}$)dt" part of eq. 10 provides exponential deflation of the popularity score (e.g., popularity$_n$(t)). When users stop viewing the posting because, for example, the help posting is obsolete, the deflation of the popularity score may be proportional to $e^{(-t/deflation)}$. Thus, the popularity score may gradually approach zero after users stop viewing a posting.

In one or more embodiments of the invention, the seed is a parameter that ensures each new posting is assigned to an initial rank. Specifically, the seed corresponding to the initial rank allows for an initial score to be assigned to the help posting so that the help posting does not start at the bottom of the ranking. In particular, if a help posting starts at the bottom of the ranking, then the help posting may remain at the bottom merely because few if any users will examine the help posting. The seed may be reduced over time to allow help postings to move to the bottom of the rankings naturally, unless they receive sufficient amount of user implicit feedback to stay close to the top. Eq. 11 provides an example seed equation for deflating the seed value over time in accordance with one or more embodiments of the invention.

$$\frac{d(seed_{posting}(t))}{dt} = -\frac{seed_{posting}(t)}{t_{posting}} \qquad \text{eq. 11}$$

As shown in eq. 11, the initial score of a posting may be deflated according to the expected number of postings entering the system in accordance with one or more embodiments of the invention. Because a view of the posting can increase the popularity, deflating the seed by the viewing interval accounts for the expected increase of the popularity. Thus, the posting does not remain at an artificial rank.

For example, the initial rank may be five. In such an example, each new help posting is assigned a seed value that places the help posting in the fifth position of the rankings. Over time, the seed may be reduced so that the posting moves to the end of the rankings if the posting is not popular and to the beginning of the rankings if the posting is popular. Other initial ranks may be used without departing from the scope of the invention. Further, the initial rank may be one of the parameter values that are identified during Monte Carlo simulations.

Continuing with the simulation application (106) in FIG. 1, the Monte Carlo model (118) is a simulation method that uses a random sampling of events having pre-defined statistical properties. In one or more embodiments of the invention, the Monte Carlo model (118) performs multi-dimensional optimization, where the number of dimensions is the number of parameters to optimize in the ranking algorithm (116). For example, the Monte Carlo model (118) may be used to identify an optimal value for $t_{deflation}$ and an optimal initial rank value. As another example, the Monte Carlo model (118) may be used to identify an optimal contribution to popularity from different user feedbacks (e.g., votes, dwell times, and other user feedbacks). Monte Carlo simulation is discussed below and in FIG. 4.

Although shown as separate applications in FIG. 1, the simulation application (106), ranking application (102), and user interface (not shown) may correspond to sub-applications of the community help forum. Specifically, the aforementioned application may be sub-programs of a single larger program.

FIGS. 2-5 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

Figure 2:
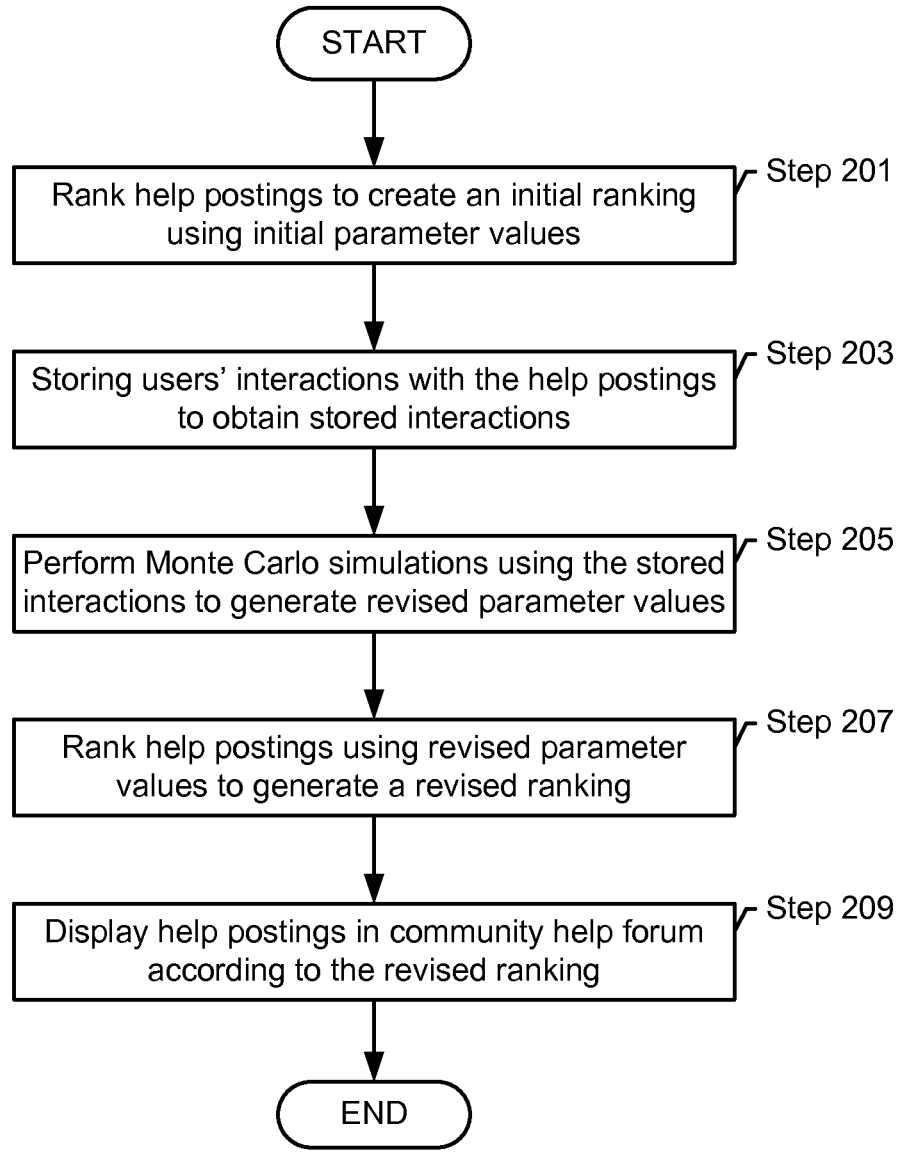
FIGS. 2-5 show flowcharts in accordance with one or more embodiments of the invention.

FIG. 2 shows an overview flowchart in accordance with one or more embodiments of the invention. In Step 201, help postings are ranked using initial parameter values to create an initial ranking. Specifically, as each user requests help postings, the ranking application ranks and may re-rank the help postings according to the initial parameter values and users' interactions with help postings. Multiple initial rankings may be created over time. For example, if multiple users select the same help posting, then over time the help posting may move to the beginning of the initial rankings because the help posting is determined to be popular. Similarly, outdated help postings may be moved to the end of the initial rankings as the popularity is reduced by deflation. Ranking help postings to create an initial ranking is discussed below and in FIG. 3.

In Step 203, while users are interacting with the initial rankings, the users' interactions are stored with the help postings to obtain stored interactions in accordance with one or more embodiments of the invention. Specifically, information about the users' interactions with the help postings can be recorded in log file, application depository or in both. For example, every user click may be recorded in the production database. Storing the users' interactions is discussed below and in FIG. 3.

In Step 205, Monte Carlo simulations are performed used the stored interactions to generate revised parameter values. Performing Monte Carlo simulations is discussed below and in FIG. 4. In one or more embodiments of the invention, the performance of the Monte Carlo simulations are independent of the ranking of the help postings by the ranking application, and independent of users' interactions with the help postings. Specifically, the ranking application may continue to rank and re-rank the help postings using initial parameter values while the Monte Carlo simulations are performed until the Monte Carlo simulations create revised parameter values. Thus, users may continue to interact with the help postings while the Monte Carlo simulations are performed to create revised parameter values.

In Step 207, the help postings are ranked using revised parameter values to generate a revised ranking. Specifically, the ranking application ranks new and existing postings using the revised parameter values to generate a revised ranking. According to the revised ranking, the help postings are displayed in the community help forum in Step 209. In one or more embodiments of the invention, the ranking of help postings using the revised parameter values and the display of the help postings are discussed below and in FIG. 5.

In one or more embodiments of the invention, the Steps performed in FIG. 2 may be repeated starting with Step 201. Specifically, the revised parameter values may be treated as initial parameter values for the next iteration of storing users' interactions with the initial parameter values and performing Monte Carlo simulations. Thus, in one or more embodiments of the invention, the parameter values may change over time to account for changes in users' behavior. For example, the parameter values may change based on seasonal variation between users and help postings.

Figure 3:
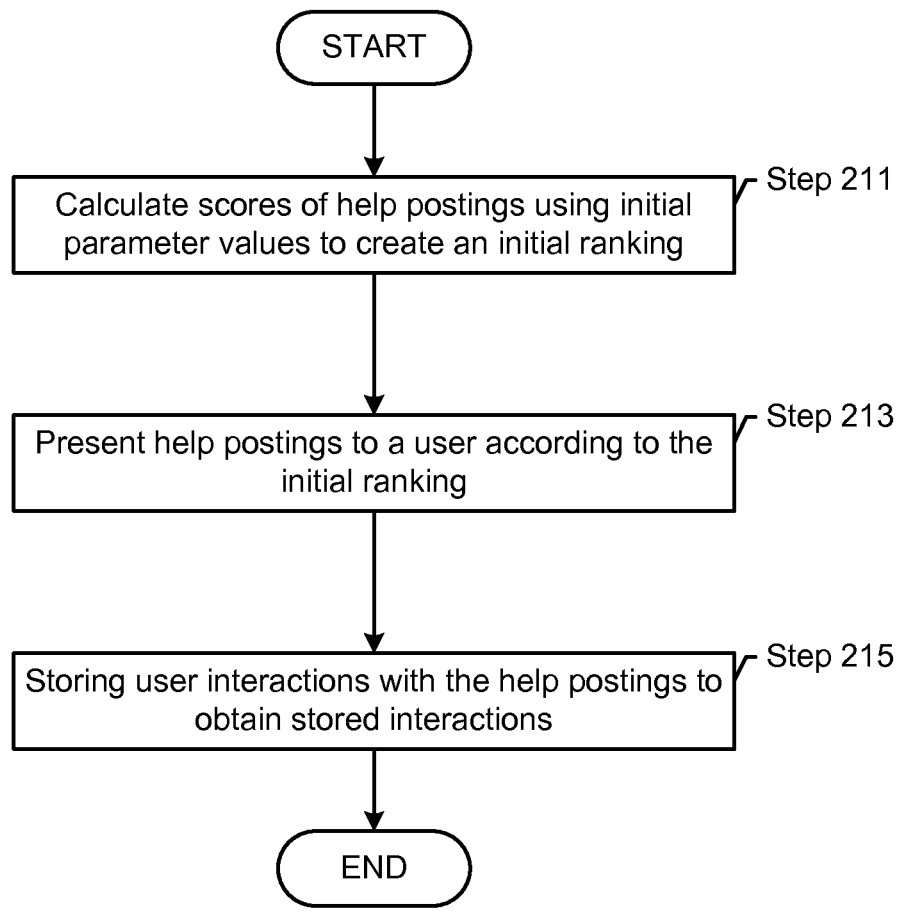

FIG. 3 shows a flowchart for allowing a user to access the help posting in an initial ranking in accordance with one or more embodiments of the invention. In Step 211, the ranking application calculates the scores of the help postings using initial parameter values to create an initial ranking. In one or more embodiments of the invention, a score is calculated for each posting using eq. 9 (discussed above).

The following is an example of how each of the components of eq. 9 may be calculated for a posting. In one or more embodiments of the invention, the quality may be calculated using posting characteristics and user characteristics. The posting characteristics are the internal characteristics about the posting, such as the existence or non existence of spelling and/or grammatical errors. To identify the posting characteristics, a grammar and spelling check may be performed on the posting to identify the number of grammatical and spelling errors that are contained in the posting.

The user characteristics correspond to information about the user that posted the posting. To identify the user characteristics, the user is identified and information about the user is extracted. For example, the user characteristics may be whether the user is a professional in the field to which the community help forum relates, the number of positive ratings that the user has received, and other characteristics about the user. The ranking application may assign a value to each of the characteristics based on a mapping function. In one or more embodiments of the invention, the ranking application may generate a single quality value from the value of each of the characteristics. An example of how to generate a single quality value from the value of each of the characteristics is shown in eq. 12.

$$\text{Quality} = \sum_{characteristic} \text{weight}_{characteristic} * \text{value}_{characteristic} \qquad \text{eq. 12}$$

As shown in eq. 12, the quality value may be calculated as the sum over all characteristics of the weight of the characteristic multiplied by the value. Eq. 12 is only one example of an equation that may be used to generate a quality value. Other equations may be used without departing from the scope of the invention. As an alternative to using a quality value, the quality of the posting may be excluded from the score.

Continuing with the example, the ranking application may calculate the popularity for the posting by analyzing the number of views and user feedback about the posting. Different popularity functions may be used without departing from the scope of the invention. Further, in one or more embodiments of the invention, the popularity may be adjusted so as to be deflated over time using eq. 10. For example, the rate of change of the popularity function may correspond to a linear function of user feedbacks, or may depend on some implicit user feedbacks non-linearly. For example, effects of dwell time may be accounted for using a step-function or a sigmoid function.

Continuing with the example of calculating a score for a posting, the ranking application identifies a seed value for the posting. For existing postings, the seed value is the previous seed value after deflation, which may be calculated, using eq. 11. For new postings, the seed value is based on an initial rank. As discussed above, the initial rank may be set based on administrator experience with community forums. Specifically, an administrator may realize over time that help postings initially ranked in the third position propagate through the rankings according to relevance rather than user bias. Accordingly, the administrator may initially set the initial rank at the third position. As discussed above, the initial rank may be one of the parameters that are revised using Monte Carlo simulations.

In one or more embodiments of the invention, the ranking application uses the initial rank to calculate a seed value for new postings. Specifically, after scores for existing postings are identified, the seed value for new postings may be calculated based on the scores. In one or more embodiments of the invention, the score of an existing posting currently in the initial rank position is identified. Further, the score of the immediately preceding existing posting in the initial rank is identified. The initial seed is selected such that the initial score of the new posting is between the scores of the two existing postings. The initial seed may be selected to account for the quality value of the new posting if a quality value exists.

The above is only one example for calculating a score for each of the postings. Different equations may be used without departing from the scope of the invention. In one or more embodiments of the invention, the ranking application incrementally updates the score for each of the help postings in the application repository. Specifically, rather than updating the score each time a user wants to access the ranking, the score may be updated at a pre-defined interval. The pre-defined interval may be based on the amount of traffic to the community help forum and/or may be based on time. Thus, when a user accesses the community help forum, scores are pre-assigned to each of the help postings in accordance with one or more embodiments of the invention. Alternatively, scores may be re-calculated for each user's request to view the rankings.

Continuing with FIG. 3, in Step 213, the help postings are presented to a user according to the initial ranking. A user using the user interface of the community help forum may trigger the presentation of the help postings according to the initial ranking. For example, the user may select a topic from a list of topics in the user interface of the community help forum. In response, the community help forum may display the rankings. For example, the user may select the topic, "401K" to view all help postings related to 401Ks. The user interface of the community help forum may access the initial ranking of help postings related to 401Ks and display the initial ranking to the user. Alternatively, the user may submit a search query which results in the community help forum displaying the rankings. The above are only a few examples of how a user may trigger the presentation of the initial ranking in accordance with one or more embodiments of the invention.

In Step 215, in one or more embodiments of the invention, while a user is interacting with the help postings, the ranking application stores the user's interactions with the help posting. For example, the ranking application may identify the help posting(s) viewed by the user and store information (rank, popularity, etc.) about the help posting(s). The ranking application may also store information about the length of time that the user viewed the ranking before viewing a help posting, the length of time that the user viewed a help posting, the user feedback for the help posting, the order in which the user viewed help postings if the user viewed multiple help postings, and other such information. The stored interactions may also include information about whether the user abandoned the search without finding a relevant help posting.

Figure 4:
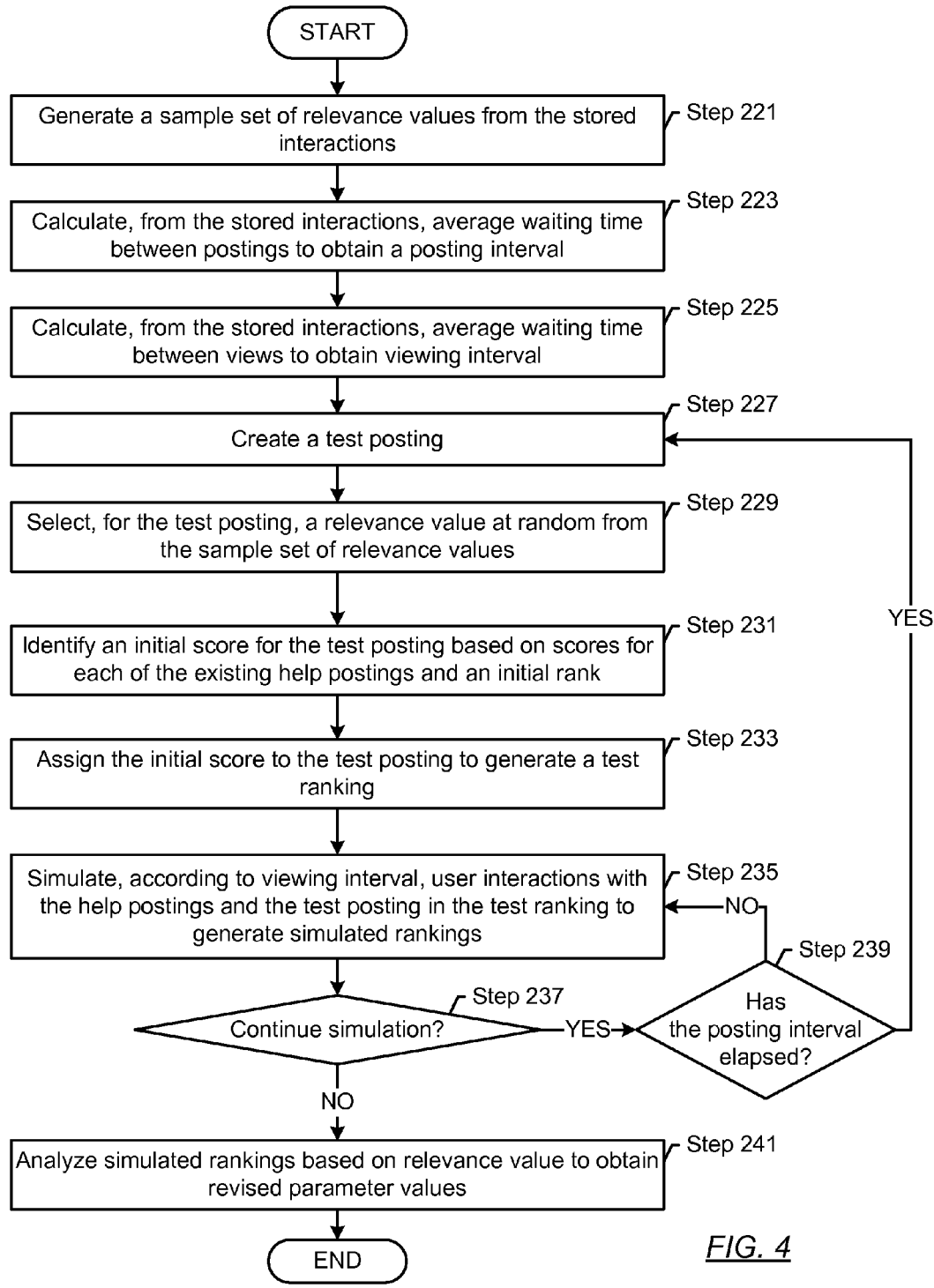

After a statistically significant number of users access the rankings, a Monte Carlo analysis can be performed on the stored interactions. FIG. 4 shows a flow diagram for performing Monte Carlo analysis to identify revised parameter values in accordance with one or more embodiments of the invention.

In Step 221, the simulation application generates a sample set of relevance values from the stored interactions in accordance with one or more embodiments of the invention. As discussed above, relevance of the highest ranking posts estimated as the probability that a user selects a help posting given that the user examined the help posting. The simulation application may generate a sample set of relevancies based on the user implicit feedback model. For example, if the user implicit feedback model is a cascade click model, then the simulation application may calculate relevance using eq. 8 (above). As shown in eq. 8, the relevance may be calculated using the equation relevance=performance/depth. In one or more embodiments of the invention, performance may be estimated based on experience with community help forums. For example, the performance may be set at 0.25. Alternatively, performance may be estimated by calculating, from the stored interactions, one minus the percentage of users, viewing a posting listing, that does not select a help posting or only leaves negative feedback. Depth may be calculated as the number of help postings that the user examined to arrive at the final help posting. Generating a sample set of relevancies may be performed by calculating repetitively calculating eq. 8 for different depths.

As discussed above, use of eq. 8 to build a sample set of relevancies is only an example. Other semi-analytical expressions may be derived for other types of models and used to estimate user implicit feedback model parameters from the application database and the log files.

In Step 223, the average waiting time between new postings is calculated to obtain a posting interval. Specifically, the simulation application may access the stored interactions to identify the frequency in which new postings are posted to the community help forum. In one or more embodiments of the invention, the posting interval is calculated as a running average. For example, the simulation application may calculate the posting interval based on the rate that new postings were posted in the previous days. Thus, the simulation application accounts for variations in the frequency based on time of year.

In Step 225, the average waiting time between views is calculated using the stored interactions in accordance with one or more embodiments of the invention. The viewing interval may be calculated similar to calculating the posting interval in accordance with one or more embodiments of the invention.

In Step 227, the simulation application creates a test posting. In one or more embodiments of the invention, the test posting is a posting that is used to track how postings may move through the rankings. For example, the test posting may be a blank posting, such as without textual or multimedia content.

In Step 229, the simulation application selects, for the test posting, a relevance value at random from the sample set of relevance values. Specifically, the simulation application may use any random selection algorithm to randomly select the relevance value from the sample set of relevance values calculated in Step 221. The relevance value is assigned to the test posting. In one or more embodiments of the invention, the relevance value remains assigned to the test posting throughout the simulation.

In Step 231, an initial score for the test posting is identified based on scores for each of the existing help postings and a seed value in accordance with one or more embodiments of the invention. As discussed above, the seed value is based on an initial rank value. The initial rank value may be a pre-defined value or a value that is being optimized in accordance with one or more embodiments of the invention. If the initial rank value is value being optimized, than an initial rank value may change as the simulations are performed. For example, consider the scenario in which simulation application is determining which initial rank value between one to twenty-five is optimal. In such a scenario, the simulation application may select a number from one to twenty-five as the initial rank value and determine whether the resulting rankings are more optimal than existing rankings. If the resulting rankings are more optimal than the existing rankings, then the selected number is deemed successful as an initial rank value.

In one or more embodiments of the invention, in order to use the initial rank value, the simulation application identifies the score of the help posting currently in the initial rank and the help posting in the preceding rank. Based on the scores, the simulation application assigns the help posting an initial seed value so that the test posting is in the initial rank. For example, consider the scenario in which the desired initial rank is three. Further, four existing help postings have scores of: eighteen, six, two, and one, respectively. In such a scenario, because the help posting currently in the third rank has a score of two and the preceding help posting has a score of six, the test posting may be assigned an initial seed value of four so that the test posting has the desired rank of three. Thus, the initial score of the test posting is four in accordance with one or more embodiments of the invention. Therefore, the initial scores of the test posting with the current help postings is: eighteen, six, four, two, and one.

In Step 233, the initial score is assigned to the test posting to generate a test ranking in accordance with one or more embodiments of the invention. In one or more embodiments of the invention, test rankings are only used by the simulation application. Specifically, scores are not adjusted in the data repository for existing help postings.

In Step 235, the simulation application simulates, according to the viewing interval, user interactions with the help postings and the test posting in the test ranking to generate simulated rankings in accordance with one or more embodiments of the invention. In particular, during each viewing interval, a simulation is performed by applying the user implicit feedback model to determine the probability that a user views each posting and how the users view each posting. Based on the model probabilities, user's interaction with the help posts, and, hence, with the rankings, is simulated by repeated random sampling.

The simulations result in a change in the popularity score of one or more postings according to the simulated viewings of the postings. The scores may be adjusted through the simulations using test parameter values. In particular, based on the change in popularity and deflation of the seed and popularity, new scores are generated for each viewing interval in accordance with one or more embodiments of the invention.

In Step 237, a determination is made whether to continue simulation in accordance with one or more embodiments of the invention. Specifically, the simulation application continues simulating to allow for postings to propagate through the test rankings.

If a determination is made to continue simulations in Step 237, a determination is made whether the posting interval elapsed in Step 239 in accordance with one or more embodiments of the invention. As discussed above, the posting interval is the average interval at which new postings are added to the rankings. Accordingly, when the posting interval elapses, a new test posting is created and propagated through the rankings in Step 227.

Alternatively, if the posting interval has not elapsed, then the simulation continues with current postings in the rankings as discussed above in Step 225. Although not shown in FIG. 4, the simulations may also include removing postings from the rankings according to queuing models in accordance with one or more embodiments of the invention. When the simulations are complete, the simulated rankings are analyzed based on the relevance value to obtain revised parameter values in Step 241. Specifically, the simulation application analyzes the simulated rankings to determine how close postings are ordered according to relevance values. Specifically, the simulation application determines whether posting are more closely ordered with the test parameter values than previous rankings with other parameter values.

Figure 5:
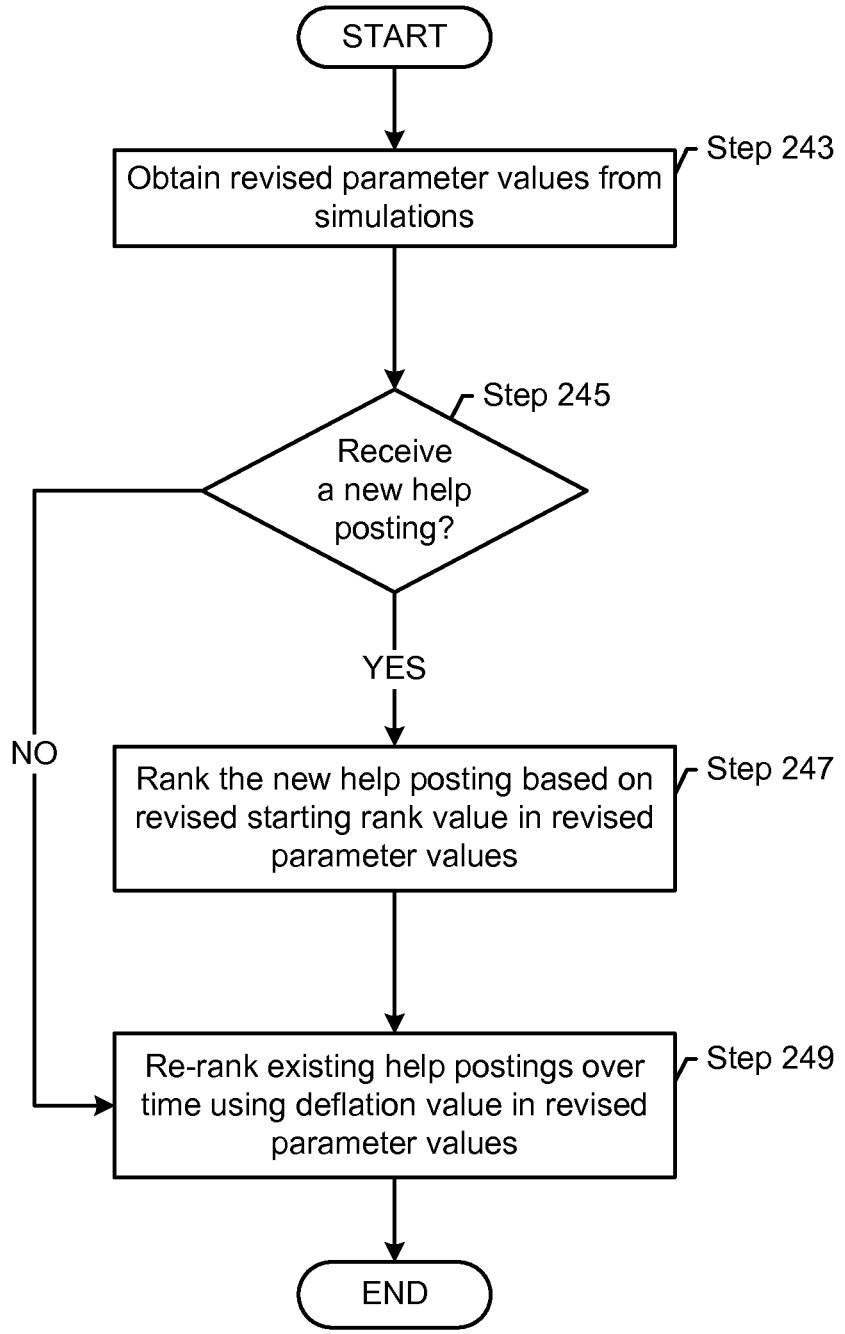

When revised parameter values that create optimal rankings are identified, the ranking application may use the revised parameter values to rank help postings in the application repository. FIG. 5 shows a flow diagram for the ranking application to rank postings using the revised parameter values when the revised parameter values include a revised initial rank value and a revised deflation value in accordance with one or more embodiments of the invention. In step 243, the revised parameter values are obtained from the simulations in accordance with one or more embodiments of the invention. Specifically, the simulation application provides the revised parameter values to the ranking application in accordance with one or more embodiments of the invention.

In Step 245, a determination is made whether a new help posting is received in accordance with one or more embodiments of the invention. When the ranking application receives a new help posting, the ranking application ranks the new help posting based on the initial rank value in the revised parameter values in Step 247. Ranking the new help posting may be performed as discussed above with reference to Step 211 in FIG. 3.

Regardless of whether a new help posting is received, in Step 249, existing help postings are re-ranked over time using the deflation value in the revised parameter values. Because revised parameter values are used, the help postings are more likely to be ordered according to relevancy in accordance with one or more embodiments of the invention. Accordingly, users may be more likely to identify a help posting that solves any questions that the user has.

The following example is for illustration purposes only. Numbers, characteristics, and tests presented below may or may not correspond to or be representative of any actual tests performed. For the following example, consider the scenario in which a tax preparation application is used by thousands of users to prepare annual tax returns. The users may have varying degrees of skills in using the tax preparation application. For example, some users may be particularly computer savvy and understand how to use the tax preparation application. Similarly, some users, such as accountants, may have a particular understanding of government rules and regulations that need to be complied with when filing a tax return. Other users may not have any experience whatsoever.

To assist all users, the vendor of the tax preparation application has a community help forum that allows users to communicate their questions with each other. The community help forum may have a variety of types of postings. For example, the community help forum may have tutorials created by the vender of the tax preparation application, postings marked as originating from accountants, documents describing different functions of the tax preparation application, and general postings having questions and responses generated by users. Accordingly, when a user has a question, the user of the tax preparation application searches the community help forum for the tax preparation application.

In the example, because personal income taxes are due for individual users every year on April 15, and new regulations are passed by Congress on an annual basis, the community help forum may exhibit the following characteristics. The community help forum may receive and process requests from most of the meticulous users between January and March. Toward the end of March and until early April, the community help forum receives and processes more requests from procrastinating users. Because the meticulous users start early and devote time to filing the tax return, the meticulous users may exhibit a higher probability of examining and viewing more help postings than the procrastinating users. For example, the average meticulous user may examine fifty help postings starting from the top of the rankings and view ten relevant help postings. In contrast, the average procrastinating user may only have time to examine ten help postings and view a single help posting. If the single help posting is not relevant, then the procrastinating user may be more likely to abandon further search. Because of these characteristics, the simulation application connected to the ranking application may adjust the initial rank value and the deflation parameter depending on the time of year.

Continuing with the example, in February, the simulation application executes the following simulations using a cascade click model as the user implicit feedback model. Because the majority of users in February are meticulous users, the users in February are more likely to identify an answer to their question. Thus, the performance of the community help forum may be 90%. Similarly, as discussed in the example, meticulous users may also examine more help postings. Specifically, the depth at which meticulous users examine help postings may correspond to a binomial distribution in which 95% of the users in February examine between 25 and 75 help postings in a linear order starting with the first help posting in the rankings. Accordingly, the sample set of relevancies may be calculated using equation 8.

Next, in the example, the simulation application simulates how test postings are propagated through the rankings using different initial rank values and deflation parameters. For example, the simulation application may test to determine whether an initial rank value of four changes the rankings. To perform the test, the simulation application add multiple test postings to the rankings according to the posting interval and simulates, based on the viewing interval, how postings are examined and viewed. Through the simulations, the simulation application may learn that because many meticulous users are likely to examine each posting, with an initial rank of four and a low deflation parameter, there is a large bias to help postings in the initial portion of the rankings. Specifically, test postings may remain close to the top of the rankings regardless of whether the test posting is relevant. Further, the simulation application may learn that with an initial rank value of fifteen and a high deflation parameter, the test postings propagate to the appropriate position in the rankings according to the relevance. Accordingly, the simulation application provides the high deflation parameter and fifteen as the initial rank value to the ranking application in February.

As discussed above, the community help forum may exhibit different characteristics in early April than in February. Specifically, in the example, in early April, procrastinating users access the community help forum. Accordingly, in early April, the simulation application executes the following simulations using a cascade click model as the user implicit feedback model. Because the majority of users in early April are procrastinating users, the users early April are less likely to identify an answer to their question. Thus, the performance of the community help forum may be 40%. Similarly, as discussed in the example, procrastinating users may also examine fewer help postings. Specifically, the depth at which procrastinating users examine help postings may correspond to a binomial distribution in which 95% of the users in early April examine between 5 and 15 help postings in a linear order starting with the first help posting in the rankings. Accordingly, the sample set of relevancies may be calculated using equation 8.

Next, in the example, the simulation application simulates how test postings are propagated through the rankings in early April using different initial rank values and deflation parameters. For example, the simulation application may test to determine whether an initial rank value of fourteen changes the rankings. To perform the test, the simulation application add multiple test postings to the rankings according to the posting interval and simulates, based on the viewing interval, how postings are examined and viewed. Through the simulations, the simulation application may learn that because many procrastinating users are less likely to examine each posting, with an initial rank of fourteen and a high deflation parameter, new test postings are rarely viewed and are propagated to the end of the ranking despite the relevance of the new test postings. Further, the simulation application may learn that with an initial rank value of three and a lower deflation parameter, the test postings propagate to the appropriate position in the rankings according to the relevance. Specifically, the procrastinating users are more likely to select a help posting closer to the top of the rankings. Accordingly, the simulation application provides the lower deflation parameter and three as the initial rank value to the ranking application in early April.

As shown in the example, embodiments of the invention can adjust the parameters used to rank help postings to accommodate time based variations in user accesses to the community help forum. Accordingly, both meticulous users who access the community help forum in February and procrastinating users who access the community help forum in early April are more likely to view help postings that answer their questions.

Figure 6:
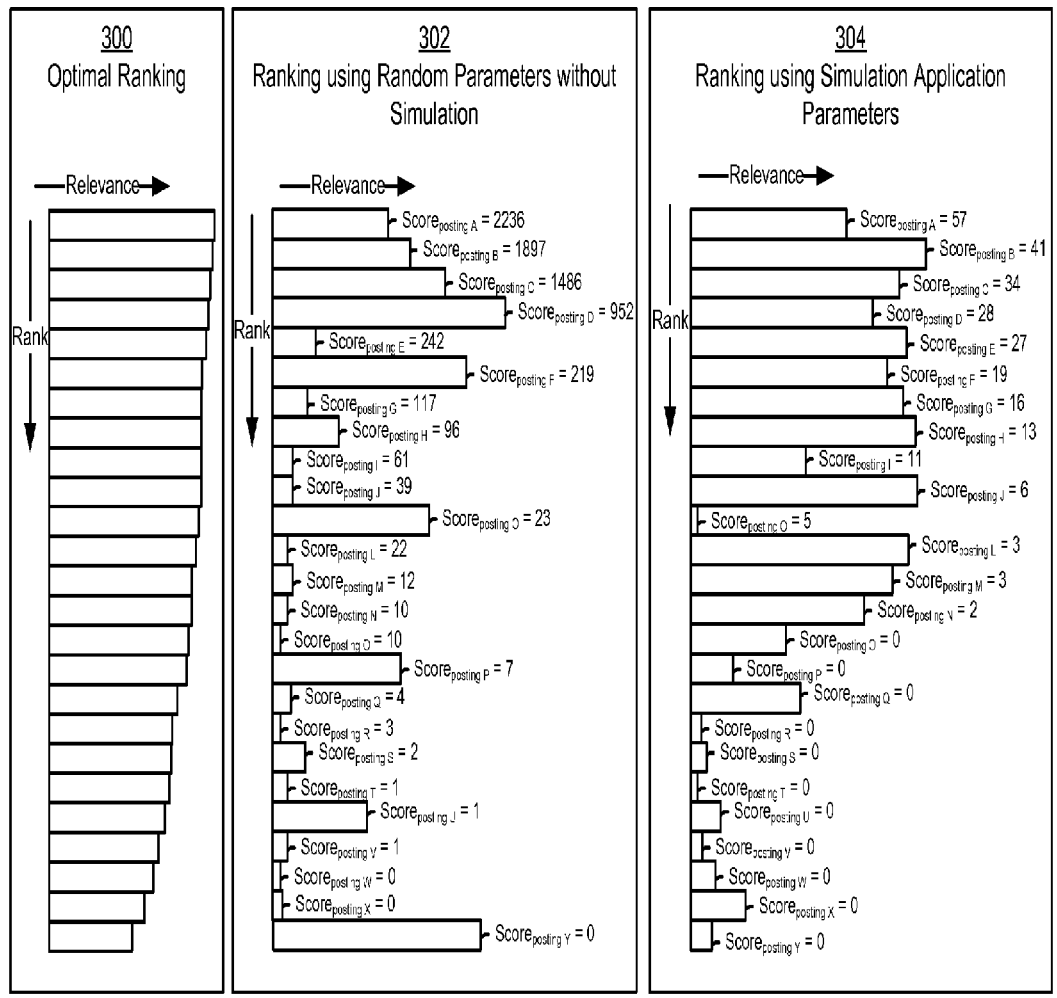
FIG. 6 shows an example of how simulation to obtain revised parameter values may create a ranking that closer corresponds to an optimal ranking.

FIG. 6 shows an example of how simulation to obtain revised parameter values may create a ranking that closer corresponds to an optimal ranking. Specifically, FIG. 6 shows three rankings: an optimal ranking (300), a ranking using random parameters without simulation (302) (hereinafter "random parameter ranking"), and a ranking using simulation application parameters (304) ("simulation parameter ranking"). In each of the rankings, each bar represents a posting. The length of the bar represents an estimated relevancy. Thus, postings with greater length are more relevant than postings with a shorter length. Further, the bars are ordered according to how the postings are ranked. Specifically, postings at the top of FIG. 6 are ranked higher than postings at the bottom of FIG. 6. Therefore, the order of postings presented to the users has the postings at the top of the ranking before the postings at the bottom.

The optimal ranking (300) is an ideal ranking of postings according to relevancy. Specifically, the optimal ranking (300) is one in which if the relevancy could be identified, then the posting would be directly ordered by relevancy. The random parameter ranking (302) is a ranking in which there is no user interaction with help postings, so that each new post is added at the top and then simply moves down as the new posts arrive. As shown in example FIG. 6, the help postings are not well ordered according to relevancy. For example, even though posting Y has a high relevancy as denoted by the long relevancy bar, posting Y is still at the bottom of the random parameter rankings (302).

The simulation parameter ranking (304) shows how postings may be ranked after performing several simulations to identify revised parameter values. As shown in FIG. 6, even though the simulation parameter rankings are not perfectly ordered according to relevancy, the simulation parameter rankings (304) are closer to optimal than the random parameter rankings (302).

Figure 7:
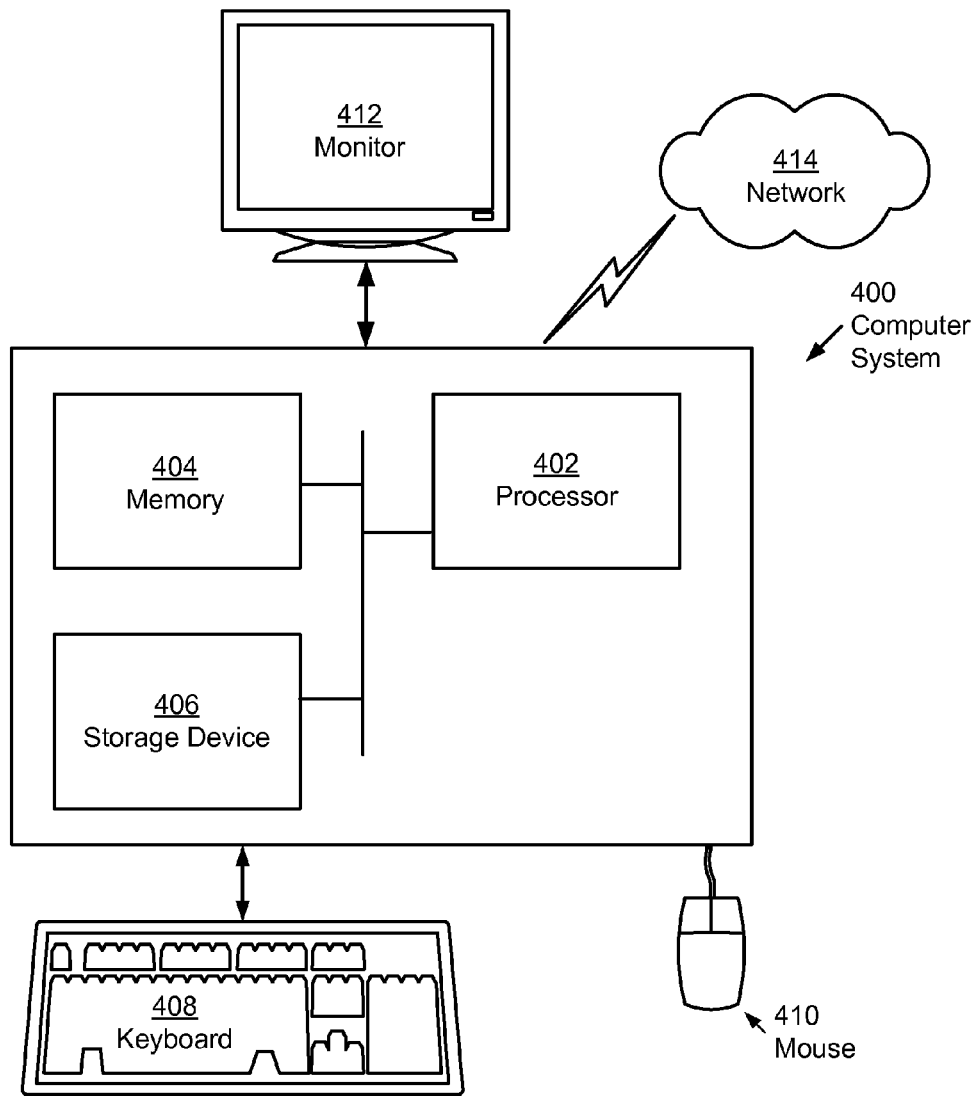
FIG. 7 shows a computer system in accordance with one or more embodiments of the invention

Embodiments of the invention may be implemented on virtually any type of computer regardless of the platform being used. For example, as shown in FIG. 7, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (402) is a hardware component, such as an integrated circuit. The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., simulation application, ranking application implementing ranking algorithms, data repository, etc., and components thereof) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions to perform embodiments of the invention may be stored, temporarily or permanently, on a computer readable medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for training a ranking application to rank a plurality of help postings for display in a forum, comprising:
   ranking the plurality of help postings to create an initial ranking, wherein the plurality of help postings in the initial ranking are ranked by the ranking application using initial parameter values;
   displaying the plurality of help postings in the forum according to the initial ranking;
   storing user interactions with the plurality of help postings to obtain stored interactions;
   performing simulations using the stored interactions to generate revised parameter values for the ranking application, wherein performing the simulations comprises:
      calculating a plurality of relevance values from the stored interactions;
      creating a test posting;
      assigning, to the test posting, an initial score and a relevance value randomly selected from the plurality of relevance values to generate a test ranking;
      determining a probability that a user will view the plurality of help postings and the test posting in the test ranking;
      generating, based on the probability, simulated rankings of the plurality of help postings and the test posting; and
      analyzing the simulated rankings based on the relevance value to obtain revised parameter values; and
   ranking, by the ranking application using the revised parameter values, the plurality of help postings to generate a revised ranking; and
   displaying the plurality of help postings in the forum according to the revised ranking.

2. The method of claim 1, further comprising:
   calculating, from the stored interactions, an average waiting time between views to obtain a viewing interval,
   wherein determining the probability is performed during the viewing interval.

3. The method of claim 1, wherein the determining the probability is performed according to a cascade click model.

4. The method of claim 1, wherein analyzing the simulated rankings comprises determining whether the simulated rankings with the revised parameter values are ordered closer to relevancy than the initial rankings.

5. The method of claim 1, wherein the revised parameter values comprises an initial rank value, and wherein the initial score calculated based on the initial rank value.

6. The method of claim 1, wherein the ranking the plurality of help postings and determining the probability uses the same ranking algorithm, wherein the ranking algorithm assigns a score to each of the plurality of help postings and test posting, and wherein the score is based on a popularity value and a seed value.

7. The method of claim 6, wherein the popularity value is reduced over time using a deflation parameter value specifying a rate of reduction over time, and wherein the revised parameter values comprise the deflation parameter value.

8. A system for training a ranking application to rank a plurality of help postings for display in a forum, the system comprising:
   a hardware processor;
   a ranking application, executing on the hardware processor and configured to:
      rank the plurality of help postings to create an initial ranking, wherein the plurality of help postings in the initial ranking is ranked by the ranking application using initial parameter values;
      display the plurality of help postings in the forum according to the initial ranking;
      store user interactions with the plurality of help postings to obtain stored interactions;
      rank, using revised parameter values, the plurality of help postings to generate a revised ranking; and
      display the plurality of help postings in the forum according to the revised ranking; and
   a simulation application, executing on the hardware processor and configured to:
      perform simulations using the stored interactions to generate revised parameter values for the ranking application, wherein performing the simulations comprises:
         calculating a plurality of relevance values from the stored interactions;
         creating a test posting;
         assigning, to the test posting, an initial score and a relevance value randomly selected from the plurality of relevance values to generate a test ranking;
         determining a probability that a user will view the plurality of help postings and the test posting in the test ranking;
         generate, based on the probability, simulated rankings of the plurality of help postings and the test posting;
         analyzing the simulated rankings based on the relevance value to obtain the revised parameter values; and
      provide the revised parameter values to the ranking application.

9. The system of claim 8, wherein the simulation application is further configured to:
calculate, from the stored interactions, an average waiting time between views to obtain a viewing interval,
wherein determining the probability is performed during the viewing interval.

10. The system of claim 8, wherein the determining the probability is performed according to a cascade click model.

11. The system of claim 8, wherein analyzing the simulated rankings comprises determining whether the simulated rankings with the revised parameter values are ordered closer to relevancy than the initial rankings.

12. The system of claim 8, wherein the revised parameter values comprises an initial rank value, and wherein the initial score calculated based on the initial rank value.

13. The system of claim 8, wherein the ranking the plurality of help postings and determining the probability uses the same ranking algorithm, wherein the ranking algorithm assigns a score to each of the plurality of help postings and test posting, and wherein the score is based on a popularity value and a seed value.

14. The system of claim 13, wherein the popularity value is reduced over time using a deflation parameter value specifying a rate of reduction over time, and wherein the revised parameter values comprise the deflation parameter value.

15. A non-transitory computer readable medium comprising computer readable program code embodied therein for causing a computer system to:
rank a plurality of help postings to create an initial ranking, wherein the plurality of help postings in the initial ranking is ranked using initial parameter values;
display the plurality of help postings in the forum according to the initial ranking;
store user interactions with the plurality of help postings to obtain stored interactions;
perform simulations using the stored interactions to generate revised parameter values, wherein performing the simulations comprises:
calculating a plurality of relevance values from the stored interactions;
creating a test posting;
assigning, to the test posting, an initial score and a relevance value randomly selected from the plurality of relevance values to generate a test ranking;
determining a probability that a user will view the plurality of help postings and the test posting in the test ranking;
generating, based on the probability, simulated rankings of the plurality of help postings and the test posting; and
analyzing the simulated rankings based on the relevance value to obtain revised parameter values; and
rank, using the revised parameter values, the plurality of help postings to generate a revised ranking; and
displaying the plurality of help postings in the forum according to the revised ranking.

16. The non-transitory computer readable medium of claim 15, wherein the ranking the plurality of help postings and determining the probability uses the same ranking algorithm, wherein the ranking algorithm assigns a score to each of the plurality of help postings and test posting, and wherein the score is based on a popularity value and a seed value.

17. The non-transitory computer readable medium of claim 16, wherein the popularity value is reduced over time using a deflation parameter value specifying a rate of reduction over time, and wherein the revised parameter values comprise the deflation parameter value.

\* \* \* \* \*